US008620531B2

(12) United States Patent
Morawek

(10) Patent No.: US 8,620,531 B2
(45) Date of Patent: Dec. 31, 2013

(54) METHOD AND DEVICE FOR CORRECTION TEMPERATURE-DEPENDENT CHANGES IN THE MECHANICAL PROPERTIES OF A MOBILE CLOSING PART OF A VEHICLE

(75) Inventor: Roman Morawek, Vienna (AT)

(73) Assignee: Continental Automotive GmbH, Hannover (DE)

( * ) Notice: Subject to any disclaimer, the term of this patent is extended or adjusted under 35 U.S.C. 154(b) by 375 days.

(21) Appl. No.: 12/742,839

(22) PCT Filed: Oct. 24, 2008

(86) PCT No.: PCT/EP2008/064465
§ 371 (c)(1),
(2), (4) Date: May 13, 2010

(87) PCT Pub. No.: WO2009/065701
PCT Pub. Date: May 28, 2009

(65) Prior Publication Data
US 2010/0256876 A1 Oct. 7, 2010

(30) Foreign Application Priority Data
Nov. 22, 2007 (DE) .................. 10 2007 056 228

(51) Int. Cl.
*G05D 3/00* (2006.01)
(52) U.S. Cl.
USPC .................................. 701/49; 318/466
(58) Field of Classification Search
USPC ..................... 701/49; 318/266, 466
See application file for complete search history.

(56) References Cited

U.S. PATENT DOCUMENTS

| 5,351,439 | A | 10/1994 | Takeda et al. ............ 49/28 |
| 5,616,997 | A | 4/1997 | Jackson et al. ............ 318/467 |
| 6,678,601 | B2 * | 1/2004 | Whinnery ............ 701/49 |

FOREIGN PATENT DOCUMENTS

| DE | 4312865 | 11/1993 | ............ E05F 15/20 |
| DE | 19633941 C2 | 12/1998 | ............ H02H 7/085 |
| DE | 10044312 | 4/2002 | ............ G05B 9/02 |
| DE | 102006057889 A1 | 6/2008 | ............ E05F 15/20 |
| EP | 1193579 | 4/2002 | ............ G05B 19/042 |
| GB | 2266389 | 10/1993 | ............ E05F 15/16 |
| GB | 2323184 | 9/1998 | ............ H02H 7/085 |
| WO | 9820592 | 5/1998 | ............ H02H 7/085 |

OTHER PUBLICATIONS

International Search Report for Application No. PCT/EP2008/064465 (6 pages), Mar. 11, 2009.

* cited by examiner

*Primary Examiner* — Michael McCullough
(74) *Attorney, Agent, or Firm* — King & Spalding L.L.P.

(57) ABSTRACT

In a method and device for correcting temperature-dependent changes in the mechanical properties of a closing part of a vehicle, the closing part can be moved by a direct current motor. As part of the production of the vehicle, the mechanical properties of the mobile closing part are ascertained during a closing procedure at a first ambient temperature and stored in a non-volatile manner in the form of a first reference characteristic in a memory of the vehicle. While the vehicle is running at least one more reference characteristic is ascertained and likewise stored in a non-volatile manner in the memory of the vehicle, whereby every additional reference characteristic is associated with a different ambient temperature. The stored reference characteristics are compared to a calculated characteristic while the vehicle is running in order to check whether jamming exists or not.

16 Claims, 3 Drawing Sheets

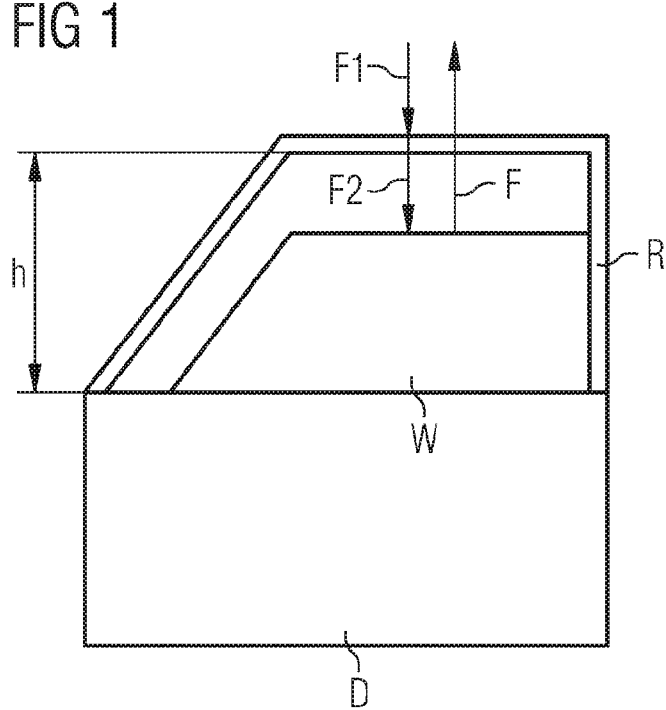
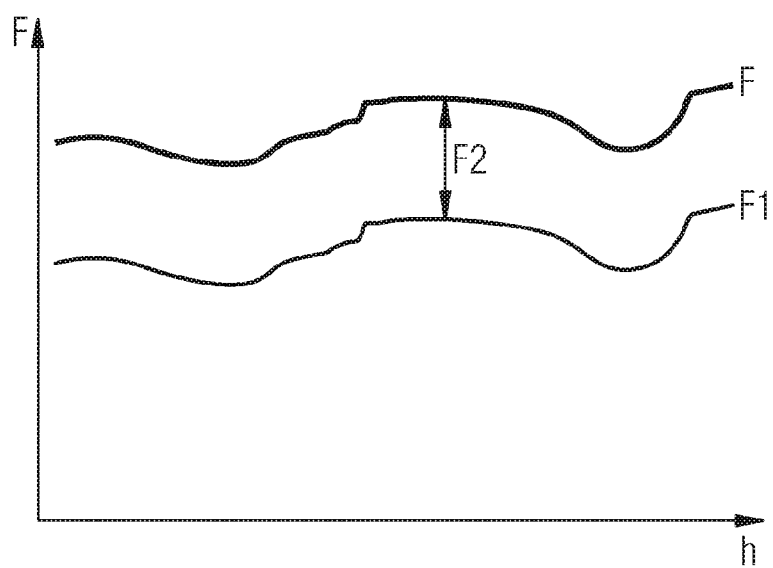

METHOD AND DEVICE FOR CORRECTION TEMPERATURE-DEPENDENT CHANGES IN THE MECHANICAL PROPERTIES OF A MOBILE CLOSING PART OF A VEHICLE

CROSS-REFERENCE TO RELATED APPLICATIONS

This application is a U.S. National Stage Application of International Application No. PCT/EP2008/064465 filed Oct. 24, 2008, which designates the United States of America, and claims priority to German Application No. 10 2007 056 228.6 filed Nov. 22, 2007, the contents of which are hereby incorporated by reference in their entirety.

TECHNICAL FIELD

The invention relates to a method and device for correction of temperature-dependent changes in the mechanical properties of a mobile closing part of a vehicle.

BACKGROUND

Because of legal requirements, closing parts of a vehicle able to be moved by a direct current motor, for example sliding roofs or window panes, are equipped with an anti-trap mechanism which operates in accordance with a predetermined algorithm.

A known anti-trap algorithm is based on a comparison between a closing force curve calculated using Hall sensor pulses or using a motor current measurement and a reference force curve. The reference force curve is generally determined during the production of the respective vehicle by calibration during a closing process and is stored in a memory of the vehicle.

During this calibration the reference force curve is determined in the form of a friction force-lifting path diagram which exactly describes the respective mechanical system. This coverage accuracy is of great importance since any possible deviations between the reference force curve and the actual circumstances of the respective existing mechanical system lead to trap forces of different sizes. Variations of this type are undesired since the trap forces are restricted on the one hand by legal requirements, but on the other hand should be as high as possible to give the system sufficient robustness in relation to undesired motor stop or reversing processes.

An actuating drive for moving remotely-actuated closing parts in motor vehicles over a lifting path and with a definable anti-trap force when the closing part encounters an obstacle is known from DE 196 33 941 C2. This known actuator has a control dependency of the respective drive force of the closing part in accordance with a previously recorded operational friction force-lifting path diagram and with a friction force increased by the permissible closing force in each case. The said friction force-lifting path diagram is recorded during the production of the motor vehicle by the drive force which is detected during a closing process of the closing part as a function of the respective lifting path position in a diagram and stored in a memory device being calculated from the motor current or the motor speed and the motor voltage. Furthermore there is provision for an updating of the friction force-lifting path diagram such that systematic differences caused by ageing, contamination etc. can be taken into account.

SUMMARY

According to various embodiments, a method and a device can be specified in which the influence of temperature-dependent changes of the mechanical characteristics of a mobile closing part of a vehicle on the anti-trap algorithm of the vehicle is reduced.

According to an embodiment, in a method for correction of temperature-dependent changes in the mechanical properties of a closing part of a motor vehicle able to be moved by a direct current motor, the mechanical properties of the movable closing part are determined during production of the motor vehicle during a closing process of the movable closing part at a first ambient temperature and are stored in the form of a reference characteristic in a memory of a motor vehicle in a non-volatile manner and for which the stored reference characteristic is compared with a calculated characteristic while the motor-vehicle is running wherein, while the motor-vehicle is running, at least one further reference characteristic is determined and stored in the memory of the motor vehicle in a non-volatile manner, with each of the further reference characteristics being assigned a different ambient temperature.

According to a further embodiment, each of the further reference characteristics can be determined adaptively while the motor vehicle is running. According to a further embodiment, the adaptation can be undertaken by linear interpolation over the temperature and by a temperature influencing factor which describes the influence of the corresponding temperature. According to a further embodiment, the first ambient temperature can be a normal temperature for which the following applies:

$$10° C. \leq T_{K1} \leq 25° C.$$

According to a further embodiment, one of the further reference characteristics can be a low-temperature characteristic. According to a further embodiment, the low-temperature characteristic may describe the mechanical properties of the movable closing part at a temperature for which the following applies:

$$-40° C. \leq T_{K2} \leq 10° C.$$

According to a further embodiment, one of the further reference characteristics can be a high-temperature characteristic. According to a further embodiment, the high-temperature characteristic may describe the mechanical properties of the mobile closing part at a temperature for which the following applies:

$$30° C. \leq T_{K3} \leq 50° C.$$

According to a further embodiment, the characteristic calculated while the vehicle is running can be calculated using speed impulses which are derived by means of a sensor from the rotor shaft of the direct current motor. According to a further embodiment, the characteristic calculated while the vehicle is running can be calculated using the motor current. According to a further embodiment, the stored reference characteristics can be updated while the motor vehicle is running. According to a further embodiment, the reference characteristics may each correspond to a friction force-lifting path diagram. According to a further embodiment, the mobile closing part can be the side window of the vehicle or a sliding roof of the vehicle.

According to another embodiment, a device for correction of temperature-dependent changes in the mechanical properties of a closing part of a vehicle able to be moved by a direct current motor, may comprise a control switch, a control unit, a direct current motor activated by the control unit via a driver, a mobile closing part driven by the direct current motor, a memory for storing an anti-trap algorithm and a reference characteristic memory, wherein the reference characteristic memory has a number of memory areas of which each is intended for storage of a reference characteristic assigned to a different temperature.

According to a further embodiment of the device, the control unit may be intended for adaptive determination of a least one of the reference characteristic while the motor vehicle is running.

BRIEF DESCRIPTION OF THE DRAWINGS

The invention is explained below in greater detail on the basis of the drawings. The figures show FIG. 1 the schematic structure of the drive of a side window of a vehicle with the forces arising during a movement of the window, FIG. 2 a friction force-lifting path diagram for a window lift drive as shown in FIG. 1, FIG. 3 a diagram in which characteristic points are plotted against the temperature, FIG. 4 a diagram in which an updating of characteristic points is illustrated, FIG. 5 a diagram in which a temperature influence factor is plotted against the temperature, FIG. 6 a block diagram of a device for correction of temperature-dependent changes in the mechanical properties of a closing part of a vehicle able to be moved by a direct current motor and FIG. 7 a sketch in which a number of friction force-lifting path diagrams are shown.

DETAILED DESCRIPTION

Figure 3:
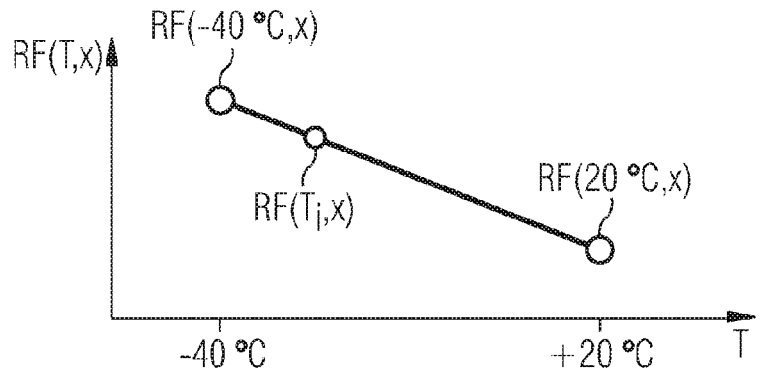

The benefits of the various embodiments are especially that the temperature-dependent changes in the mechanical characteristics of the movable closing part have less influence on the anti-trap protection algorithm of the vehicle than is the case with conventional systems. In particular undesired fluctuations in relation to the trap force are reduced compared to conventional systems.

According to various embodiments, a method and device for correction of temperature-dependent changes in the mechanical properties of a closing part of a vehicle able to be moved by a direct current motor, as part of the production of the motor vehicle in the factory, the drive force is detected as a function of the respective lifting position during a closing process of the mobile closing part, which for example involves a side window of the motor-vehicle or a sliding roof of the motor-vehicle, and is stored in a non-volatile manner in the form of a first reference characteristic in a memory device of the motor vehicle. By using this reference characteristic, during the later running of the motor vehicle with movement processes of the closing part, the maximum allowable force limit can be calculated in each case by addition of a predetermined permitted trap force, with a reversing process being initiated if this force is exceeded.

FIG. 1 shows the schematic structure of the drive of a side window of a motor vehicle with the forces arising during a movement of the window. In this case the maximum permitted drive force F to move the window pane W via its lifting path h is shown. This permitted to drive force F is produced from the friction force F1 to be overcome in each case and a defined permitted closing force F2. The motor vehicle door is labeled D, the window frame is labeled R.

In the friction force-lifting path diagram shown in FIG. 2, the friction force F1 over the lifting path h of the window pane is shown by way of example. The friction force-lifting path diagram is determined during the production of a motor vehicle and stored in a non-volatile memory of the motor vehicle.

The respective friction force F1 is increased by the defined permitted closing force F2. The curve F describes the maximum permitted drive force of the motor as a function of the lifting path.

The maximum drive force F of the motor is proportional to the motor current in the adjustment area of interest. This can either be measured directly or detected indirectly using further motor parameters, for example the battery voltage, the motor speed or the internal motor resistance taking into account an EMC constant of the motor.

While the vehicle is running the stored friction force-lifting path diagram which represents the first reference characteristic can be advantageously updated in order to take account of differences in the during production of the motor-vehicle resulting from ageing etc. Furthermore there can be updating in respect of the supply voltage of the direct current motor in the sense that this parameter is detected at the start of a closing process and is taken into account during the determination of the drive force.

As a result of using the first reference characteristic described above created during the production of the motor vehicle, it is ensured that the mechanical properties of a closing part of the motor vehicle able to be moved by a direct current motor will be precisely reproduced. This precision is important for the running of the motor vehicle since possible deviations lead directly to significant fluctuations in the trap forces. These significant fluctuations of the trap forces are undesirable since on the one hand they are restricted by legal requirements but on the other hand should be as high as possible to give the overall system sufficient robustness in relation to undesired motor stop or motor reversing processes.

In order to reduce the said undesired fluctuations of the trap forces, at least one further reference characteristic is determined while the motor vehicle is running and stored in non-volatile manner in the memory of the motor vehicle. Each of these further reference characteristics is assigned to a different ambient temperature.

The first reference characteristic described above has been—as stated—recorded during the production of the motor vehicle in the factory. A first ambient temperature obtains there which will be referred to below as the normal temperature. Preferably the following relationship applies for this normal temperature:

$$10° C. \leq T_{K1} \leq 25° C.$$

A second reference characteristic is typically a low-temperature reference characteristic. This describes the mechanical properties of the mobile closing part at a temperature for which the following relationship preferably applies:

$$-40° C. \leq T_{K2} \leq -10° C.$$

A possible third reference characteristic is typically a high-temperature reference characteristic. This describes the mechanical properties of the mobile closing part at a temperature for which the following relationship preferably applies:

$$30° C. \leq T_{K3} \leq 50° C.$$

The further reference characteristics can basically also be determined during production of the motor vehicle in the factory and stored in a non-volatile manner. However this would involve a very great deal of effort. For example the motor vehicle would have to be cooled down to −40° C. for this purpose.

To avoid this high level of effort, the further reference characteristics are determined adaptively while the motor vehicle is running. In such cases the starting point is the first reference characteristic which typically corresponds to a room temperature of $T_{K1}=20°$ C. and temperature-specific changes are made. For example it is defined that the second reference characteristic is a low-temperature characteristic and describes the mechanical properties of the mobile closing part at $T_{K2}=-40°$ C.

During a reconstruction of the characteristic points at any given temperature T between $-40°$ C. and $20°$ C., i.e. $T\epsilon[-40°$ C., $20°$ C.] a characteristic point RF at a position x is determined while the motor is running as follows $$RF(T, x) = RF(20° C., x) + \frac{[RF(-40° C., x) - RF(20° C., x)] \cdot (T - 20° C.)}{-40° C. - 20° C.}.$$

In general the following applies:

$$RF(T, x) = RF(T_{K1}, x) + \frac{[RF(T_{K2}, x) - RF(T_{K1}, x)] \cdot (T - T_{K1})}{T_{K2} - T_{K1}}.$$

This means that a current characteristic point is obtained by a linear interpolation.

This is illustrated in FIG. 3. In this FIG. 3 characteristic points RF(T,x) are plotted against the temperature T. The characteristic point $RF(T_i,x)$ shown in FIG. 3, is to be found on the connecting line between the characteristic points RF(-40° C.,x) and RF(20° C.,x).

The reconstructed characteristic point $RF(T_i,x)$ is used as the reference force for the anti-trap protection algorithm of the vehicle. The force value measured from the motor speed using speed pulses and the motor voltage or from the motor current is compared with this reference force in order to detect whether trapping is present or not.

If it is detected that there is no trapping, the measured force value is used to update the two stored reference characteristics in order to adapt these reference characteristics to the mechanical properties of the closing part changing during running as a result of ageing.

This occurs by the deviation from the characteristic point first being determined.

$$\Delta RF(T_i,x) = RF_{measured}(T_i,x) - RF(T_i,x).$$

The deviation is then distributed to the reference characteristics as follows:

$$\Delta RF(-40° C., x) = RF(T_i, x) \cdot \frac{(T - 20° C.)}{-40° C. - 20° C.};$$

In general the following applies:

$$\Delta RF(T_{K2}, x) = \Delta RF(T_i, x) \cdot \frac{T - T_{K1}}{T_{K2} - T_{K1}};$$

$$\Delta RF(-20° C., x) = \Delta RF(T_i, x) \cdot \left[1 - \frac{(T - 20° C.)}{-40° C. - 20° C.}\right].$$

In general the following applies:

$$\Delta RF(T_{K1}, x) = \Delta RF(T_i, x)\left[1 - \frac{T - T_{K1}}{T_{K2} - T_{K1}}\right]$$

Subsequently the characteristics are updated with the calculated values. In such cases the deviations are preferably restricted to a limit value $\Delta RF_{max}$. This has the advantage of one-off faults not having any direct corrupting influence on the reference characteristics.

Figure 4:
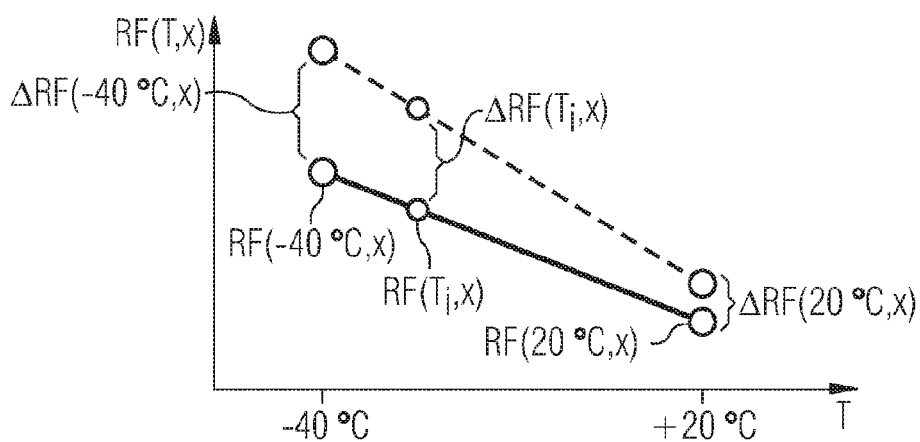

The method of operation described here is illustrated in FIG. 4. Using the characteristic points RF(-40° C.,x), $RF(T_i,x)$ and RF(20° C.,x) already shown in FIG. 3 as its starting point, this shows the respective associated deviation $\Delta RF(-40° C.,x)$, $\Delta RF(T_i,x)$ and $\Delta RF(20° C.,x)$ as well as the respective associated updated characteristic points.

The desired low-temperature characteristic is successively formed by the permanent updating so that this does not have to be determined during the production of the motor vehicle. Temperature-dependent trap force fluctuations initially occurring are thus constantly reduced.

Figure 5:
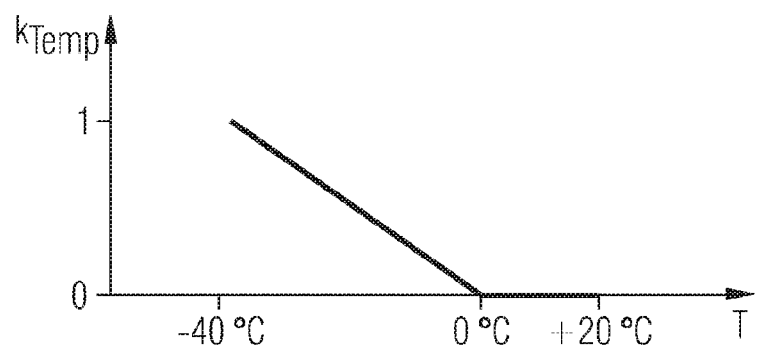

In the previous embodiment it has been assumed that temperature-dependent changes of the mechanical properties of the closing part are dependent in a linear manner on temperature changes which occur. Since however this is not always the case in practice, the described linear interpolation can if necessary be expanded as a function of the temperature to any given profile. Such a profile is shown by way of example in FIG. 5. This figure shows a diagram in which a temperature influence factor $K_{Temp}(T)$ is plotted against the temperature. This temperature influence factor is included equally in the relationships for the reconstruction of the characteristics and the updating of the characteristics. The temperature influence factor $K_{Temp}(T)$ in this case is a value between zero and one and specifies how great the influence of the surrounding temperature characteristics is at the corresponding temperature. The calculations for the reconstruction of a characteristic are undertaken as follows:

$$RF(T,x) = RF(20° C.,x) + [RF(-40° C.,x) - RF(20° C.,x)] \cdot K_{Temp}(T).$$

A corresponding adaptation by taking into account the factor $K_{Temp}(T)$ is also to be undertaken in conjunction with the updating of the reference characteristics as follows:

$$\Delta RF(-40° C.,x) = \Delta RF(T_i,x) \cdot K_{Temp}(T);$$

$$\Delta RF(20° C.,x) = \Delta RF(T_i,x) \cdot (1 - K_{Temp}(T)).$$

The method described here can be applied to any given number of reference characteristics at different temperatures. Those two characteristics are then to be considered which are closest to the current ambient temperature on either side.

Figure 6:
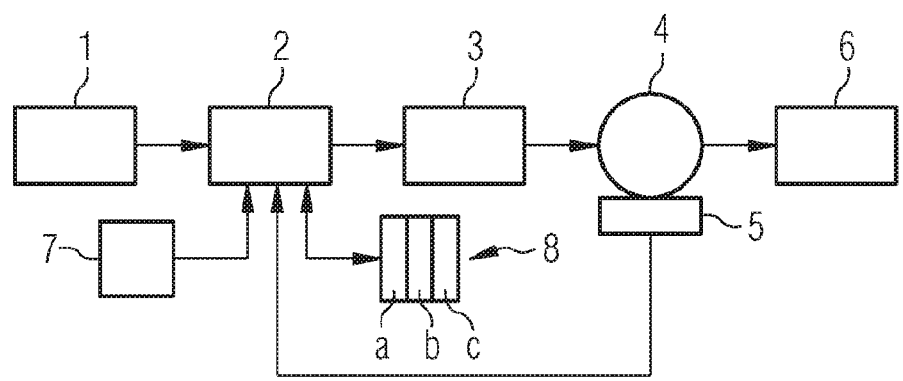

FIG. 6 shows a device for correction of temperature-dependent changes to the mechanical properties of a closing part of a motor vehicle able to be moved by a direct current motor. This device features an operating switch 1, a control unit 2 realized as a microcomputer, a driver 3, a direct current motor 4, a Hall Sensor 5, a mobile closing part 6, a memory 7 for an anti-trap algorithm and a memory 8 for reference characteristics. The memory 8 typically features three memory areas 8a, 8b and 8c, with memory area 8a being intended to store a first reference characteristic, memory area 8b to store a second reference characteristic and memory area 8c to store a third reference characteristic.

A movement of the mobile closing part is initiated by actuation of the control switch 1. Its output signal is supplied to the control unit 2 which delivers activation signals for the direct current motor 4 via the driver 3. This in its turn controls the mobile closing part 6 such that it is moved in the direction of its closed or in the direction of its open state.

While the direct current motor is running impulses are derived by means of the Hall Sensor 5 from the rotor shaft of the motor and fed to the control unit 2. This counts the impulses and determines the speed of rotation of the motor. From this in its turn the drive force of the motor is determined in conjunction with the motor voltage. Furthermore the control unit 2 is provided for executing the anti-trap algorithm stored in memory 7. Furthermore the control unit 2 is intended for determining the reference characteristics described above and storing them in the memory areas 8a, 8b and 8c of the memory 8 in a non-volatile manner. In such cases the first reference characteristic is already determined in the factory when the motor vehicle is produced, the one or more further reference characteristics are determined—as has been described above—adaptively while the motor vehicle is running.

Figure 7:
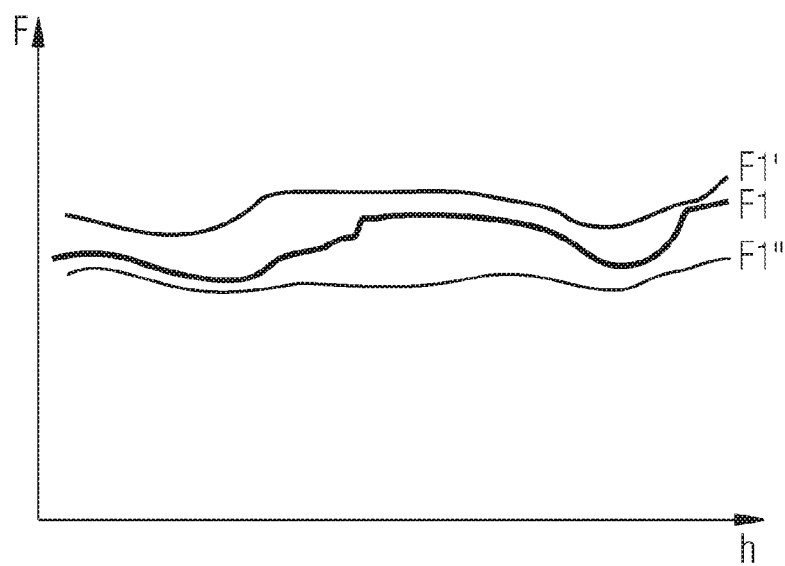

FIG. 7 shows a sketch in which a number of friction force-lifting path diagrams or reference characteristics respectively are represented, with for example the reference characteristic F1 being stored in the memory area 6a, the reference characteristic F1' in the memory area 8b and the reference characteristic F1" in the memory area 8c of the memory 8.

In the exemplary embodiment described above the memory 8 is intended as storage of reference characteristics. Reference characteristics are to be understood within the meaning of the invention also as a reference characteristic formed from a plurality of points with interpolation able to be carried out between these points to obtain further values.

What is claimed is:

1. A method for reducing the influence of temperature-dependent changes in the mechanical properties of a closing part of a motor vehicle able to be moved by a direct current motor, on an anti-trap algorithm executed by a microcomputer of the motor vehicle, comprising:
   determining the mechanical properties of the movable closing part during production of the motor vehicle during a closing process of the movable closing part at a first ambient temperature,
   storing the determined mechanical properties in the form of a first reference characteristic in a memory of the motor vehicle in a non-volatile manner,
   comparing the stored first reference characteristic to a characteristic calculated by the microcomputer while the motor-vehicle is running, and
   while the motor-vehicle is running, the microcomputer adaptively determining a second reference characteristic by:
      first obtaining a current characteristic point at a given temperature by applying linear interpolation between two previously stored characteristic points corresponding respectively to one temperature higher than the given temperature and one temperature lower than the given temperature,
      comparing the current characteristic point to a current drive force value of the direct current motor indicative of whether trapping is occurring, and
      if the comparison of the current characteristic point to the current drive force value shows that no trapping is occurring, updating the stored first reference characteristic and the second reference characteristic based at least in part on the mechanical properties, and
   storing the second reference characteristic in the memory of the motor vehicle in a non-volatile manner, wherein the second reference characteristic defines mechanical properties of the movable closing part during a closing process of the movable closing part at a different ambient temperature.

2. The method according to claim 1, wherein the first ambient temperature is a normal temperature $T_{K1}$ for which the following applies:

$$10° C. \leq T_{K1} \leq 25° C.$$

3. The method according to claim 2, wherein a low-temperature characteristic describes the mechanical properties of the movable closing part at a temperature $T_{K2}$ for which the following applies:

$$-40° C. \leq T_{K2} \leq 10° C.$$

4. The method according to claim 3, wherein a high-temperature characteristic describes the mechanical properties of the mobile closing part at a temperature $T_{K3}$ for which the following applies:

$$30° C. \leq T_{K3} \leq 50° C.$$

5. The method according to claim 1, wherein one of the further reference characteristics is a low-temperature characteristic.

6. The method according to claim 1, wherein one of the further reference characteristics is a high-temperature characteristic.

7. The method according to claim 1, wherein the characteristic calculated while the vehicle is running is calculated using speed impulses which are derived by means of a sensor from a rotor shaft of the direct current motor.

8. The method according to claim 1, wherein the characteristic calculated while the vehicle is running is calculated using a motor current.

9. The method according to claim 1, wherein the stored reference characteristics are updated while the motor vehicle is running.

10. The method according to claim 1, wherein the reference characteristics each correspond to a friction force-lifting path diagram.

11. The method according to claim 1, wherein the mobile closing part is a side window of the vehicle or a sliding roof of the vehicle.

12. A device for reducing the influence of temperature-dependent changes in the mechanical properties of a closing part of a motor vehicle able to be moved by a direct current motor, on an anti-trap algorithm of the motor vehicle, comprising
   a control switch,
   a control unit,
   a direct current motor activated by the control unit via a driver,
   a mobile closing part driven by the direct current motor,
   a memory for storing the anti-trap algorithm, and
   a reference characteristic non-volatile memory,
   wherein the reference characteristic memory has a number of memory areas operable to store a respective reference characteristic assigned to a corresponding different temperature, and
   the control unit including a microcomputer programmed to dynamically modify at least one of the reference characteristics over time to account for changes in the mechanical properties of the movable closing part over time by:
      first obtaining a current characteristic point at a given temperature by applying linear interpolation between two previously stored characteristic points corresponding respectively to one temperature higher than the given temperature and one temperature lower than the given temperature, comparing the current characteristic point to a current drive force value of the direct current motor indicative of whether trapping is occurring, and if the comparison of the current characteristic point to the current drive force value shows that no trapping is occurring, updating a stored respective reference characteristic based at least in part on the mechanical properties.

13. A system for reducing the influence of temperature-dependent changes in the mechanical properties of a closing part of a motor vehicle able to be moved by a direct current motor, on an anti-trap algorithm of the motor vehicle, comprising:

means for determining the mechanical properties of the movable closing part during production of the motor vehicle during a closing process of the movable closing part at a first ambient temperature, a non-volatile memory storing the mechanical properties in the form of a first reference characteristic, wherein the stored first reference characteristic is compared with a calculated characteristic while the motor-vehicle is running, and wherein, while the motor-vehicle is running, the means are further operable to adaptively determine one or more second reference characteristics and to store the one or more second reference characteristics in the non-volatile memory, adaptively determining the one or more second reference characteristics by:

first obtaining a current characteristic point at a given temperature by applying linear interpolation between two previously stored characteristic points corresponding respectively to one temperature higher than the given temperature and one temperature lower than the given temperature, comparing the current characteristic point to a current drive force value of the direct current motor indicative of whether trapping is occurring, and if no trapping is occurring, updating the first reference characteristic and the second reference characteristic based at least in part on the current force value, and storing the one or more second reference characteristics in the non-volatile memory and associating it with a specific ambient temperature.

14. The system according to claim 13, wherein the first ambient temperature is a normal temperature $T_{K1}$ for which the following applies:

$$10° C. \leq T_{K1} \leq 25° C.$$

15. The system according to claim 13, wherein one of the one or more second reference characteristics includes a low-temperature characteristic which describes the mechanical properties of the movable closing part at a temperature $T_{K2}$ for which the following applies:

$$-40° C. \leq T_{K2} \leq 10° C.; \text{ and}$$

one of the one or more second reference characteristics is a high-temperature characteristic which describes the mechanical properties of the mobile closing part at a temperature $T_{K3}$ for which the following applies:

$$30° C. \leq T_{K3} \leq 50° C.$$

16. The system according to claim 13, wherein the mobile closing part is the side window of the vehicle or a sliding roof of the vehicle.

* * * * *